United States Patent
Wang et al.

(10) Patent No.: US 11,301,641 B2
(45) Date of Patent: Apr. 12, 2022

(54) METHOD AND APPARATUS FOR GENERATING MUSIC

(71) Applicant: Tencent Technology (Shenzhen) Company Limited, Shenzhen (CN)

(72) Inventors: Nan Wang, Shenzhen (CN); Wei Liu, Shenzhen (CN); Lin Ma, Shenzhen (CN); Wenhao Jiang, Shenzhen (CN); Guangzhi Li, Shenzhen (CN); Shiyin Kang, Shenzhen (CN); Deyi Tuo, Shenzhen (CN); Xiaolong Zhu, Shenzhen (CN); Youyi Zhang, Shenzhen (CN); Shaobin Lin, Shenzhen (CN); Yongsen Zheng, Shenzhen (CN); Zixin Zou, Shenzhen (CN); Jing He, Shenzhen (CN); Zaizhen Chen, Shenzhen (CN); Pinyi Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 343 days.

(21) Appl. No.: 16/660,407

(22) Filed: Oct. 22, 2019

(65) Prior Publication Data
US 2020/0051536 A1 Feb. 13, 2020

Related U.S. Application Data (63) Continuation of application No. PCT/CN2018/107361, filed on Sep. 25, 2018.

(30) Foreign Application Priority Data

Sep. 30, 2017 (CN) .......................... 201710920219.7

(51) Int. Cl.
*G06F 40/56* (2020.01)
*G10H 1/00* (2006.01)
(Continued)

(52) U.S. Cl.
CPC .......... *G06F 40/56* (2020.01); *G10H 1/0025* (2013.01); *G10L 13/00* (2013.01); *G10L 13/047* (2013.01);
(Continued)

(58) Field of Classification Search
CPC ....... G06F 40/56; G10L 13/00; G10L 13/047; G10H 1/0025; G10H 2210/071; G10H 2210/105; G10H 2210/111
(Continued)

(56) References Cited

U.S. PATENT DOCUMENTS

| 6,084,169 A | * | 7/2000 | Hasegawa | ............ G10H 1/0025 84/DIG. 12 |
| 6,506,969 B1 | * | 1/2003 | Baron | .................. G10H 1/0025 84/613 |

(Continued)

FOREIGN PATENT DOCUMENTS

| CN | 101313477 A | * | 11/2008 | .......... G10H 1/0025 |
| CN | 101313477 A | | 11/2008 | |

(Continued)

OTHER PUBLICATIONS

International Search Report, issued in International Application No. PCT/CN2018/107361, dated Jan. 4, 2019, pp. 1-2, State Intellectual Property Office of the P.R. China, Beijing, China.

*Primary Examiner* — Christina M Schreiber
(74) *Attorney, Agent, or Firm* — Crowell & Moring LLP (57) ABSTRACT

A terminal for generating music may identify, based on execution of scenario recognition, scenarios for images previously received by the terminal. The terminal may generate respective description texts for the scenarios. The terminal may execute keyword-based rhyme matching based on the respective description texts. The terminal may generate respective rhyming lyrics corresponding to the images.

(Continued)

The terminal may convert the respective rhyming lyrics corresponding to the images into a speech. The terminal may synthesize the speech with preset background music to obtain image music.

20 Claims, 5 Drawing Sheets

(51) Int. Cl.
*G10L 13/047* (2013.01)
*G10L 13/00* (2006.01)

(52) U.S. Cl.
CPC . *G10H 2210/071* (2013.01); *G10H 2210/105* (2013.01); *G10H 2210/111* (2013.01)

(58) Field of Classification Search
USPC .......................................................... 84/609
See application file for complete search history.

(56) References Cited

U.S. PATENT DOCUMENTS

| | | | | |
|---|---|---|---|---|
| 10,854,180 | B2* | 12/2020 | Silverstein | G06N 7/005 |
| 2009/0132231 | A1* | 5/2009 | O'Dell | G06F 3/018 |
| | | | | 704/2 |
| 2009/0217805 | A1* | 9/2009 | Lee | G10H 1/0025 |
| | | | | 84/613 |
| 2012/0131054 | A1* | 5/2012 | Doi | G06F 16/90344 |
| | | | | 707/E17.014 |
| 2017/0092247 | A1* | 3/2017 | Silverstein | G06N 20/00 |
| 2017/0263228 | A1* | 9/2017 | Silverstein | G10H 1/00 |
| 2018/0374461 | A1* | 12/2018 | Serletic | H04N 9/8211 |
| 2019/0147060 | A1* | 5/2019 | Lau | G06F 40/279 |
| | | | | 709/206 |
| 2020/0051536 | A1* | 2/2020 | Wang | G10L 13/047 |
| 2020/0082850 | A1* | 3/2020 | He | G11B 27/28 |
| 2020/0251146 | A1* | 8/2020 | St. John Brislin | G06V 20/46 |
| 2021/0056952 | A1* | 2/2021 | Van Der Ploeg | G10H 1/0025 |
| 2021/0248983 | A1* | 8/2021 | Balassanian | G05B 15/02 |
| 2021/0264952 | A1* | 8/2021 | Zhu | H04N 21/845 |

FOREIGN PATENT DOCUMENTS

| | | | | | |
|---|---|---|---|---|---|
| CN | 103927366 | A | | 7/2014 | |
| CN | 105955938 | A | | 9/2016 | |
| CN | 106547789 | A | * | 3/2017 | ........... G06F 16/632 |
| CN | 106547789 | A | | 3/2017 | |
| CN | 106657817 | A | | 5/2017 | |
| CN | 107122492 | A | * | 9/2017 | |
| CN | 107122492 | A | | 9/2017 | |
| CN | 109599079 | A | | 4/2019 | |
| JP | 2021135335 | A | * | 9/2021 | |

* cited by examiner

METHOD AND APPARATUS FOR GENERATING MUSIC

CROSS REFERENCE TO RELATED APPLICATIONS

This application is a continuation of International Application PCT/CN2018/107361, filed Sep. 25, 2018 entitled METHOD AND APPARATUS FOR GENERATING MUSIC, which claims priority to Chinese Patent Application No. 201710920219.7, filed on Sep. 30, 2017, both of which are incorporated herein by reference in their entireties.

TECHNICAL FIELD

This application relates to the field of computer technologies, and in particular, to generating of music.

BACKGROUND

Music plays an significant role in people's life, and can be classified into different music genres according to different rhythms. Rap music or hip hop is a music genre in which lyrics are chanted (rapped) to the accompaniment in a rhythmic way. Accompaniments in use are mostly generated by means of music sampling. Currently, music is mainly created by people manually. For example, rap music may be compiled by rappers. However, people without music foundations are incapable of creating music.

SUMMARY

Aspects of the present disclosure include various methods and apparatuses, and computer storage mediums, and systems for generating music. By way of introductory example, a first aspect of the present disclosure may include a method for generating music. The method may include identifying, by a terminal, based on execution of scenario recognition, scenarios for images previously received by the terminal. The method may further include generating respective description texts for the scenarios. The method may further include executing keyword-based rhyme matching based on the respective description texts. The method may further include generating respective rhyming lyrics corresponding to the images. The method may further include converting the respective rhyming lyrics corresponding to the images into a speech. The method may further include synthesizing the speech with preset background music to obtain image music.

A second aspect of the present disclosure may include a terminal. The terminal may identify, based on execution of scenario recognition, scenarios for images previously received by the terminal. The terminal may generate respective description texts for the scenarios. The terminal may execute keyword-based rhyme matching based on the respective description texts. The terminal may generate respective rhyming lyrics corresponding to the images. The terminal may convert the respective rhyming lyrics corresponding to the images into a speech. The terminal may synthesize the speech with preset background music to obtain image music.

A third aspect of the present disclosure may include a non-transitory computer readable storage medium. The non-transitory computer readable storage medium may include instructions executable by the processor to identify, based scenario recognition, scenarios for images previously received. The non-transitory computer readable storage medium may include instructions executable by the processor to generate respective description texts for the scenarios. The non-transitory computer readable storage medium may include instructions executable by the processor to cause keyword-based rhyme matching based on the respective description texts. The non-transitory computer readable storage medium may include instructions executable by the processor to generate respective rhyming lyrics corresponding to the images. The non-transitory computer readable storage medium may include instructions executable by the processor to convert the respective rhyming lyrics corresponding to the images into a speech. The non-transitory computer readable storage medium may include instructions executable by the processor to synthesize the speech with preset background music to obtain image music.

Additional or alternative aspects and technical advancements are provided in the present disclosure.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 5-$a$ is a schematic structural diagram of composition of an apparatus for generating music according to an embodiment of this application;

FIG. 5-$b$ is a schematic structural diagram of composition of a scenario recognition logical component according to an embodiment of this application;

FIG. 5-$c$ is a schematic structural diagram of composition of a rhyme matching logical component according to an embodiment of this application;

FIG. 5-$d$ is a schematic structural diagram of composition of a lyrics generating logical component according to an embodiment of this application;

FIG. 5-$e$ is a schematic structural diagram of composition of a lyrics obtaining logical component according to an embodiment of this application;

FIG. 5-$f$ is a schematic structural diagram of composition of a speech generating logical component according to an embodiment of this application.

DETAILED DESCRIPTION

While various embodiments are described herein, it will be apparent to those of ordinary skill in the art that many more embodiments and implementations are possible. Accordingly, the embodiments described herein are examples, not the only possible embodiments and implementations.

To implement no-threshold music creation and generate music to be enjoyed by ordinary users, there are the following two methods for generating music in the related technology: the first method is to convert a sound of a video into music, and the second method is to convert a speech recorded by a user into music. In the first method of generating music from a sound of a video, video data needs to be processed to extract sound data carried in the video, and then background music is added to the sound, thereby generating music to be enjoyed by a user. In the second method of generating music by using a speech, video data does not need to be processed, and music to be enjoyed by a user can be generated merely by synthesizing the speech with background music.

The foregoing technical solution for generating music can only add background music to a sound or speed of a video. In this music generating method, audio features of the sound or speech are not taken into consideration. Therefore, the generated music cannot be closely associated with music materials provided by a user. As a result, the generated music cannot match the music materials inputted by the user.

In some embodiments of this application, scenario recognition is performed on multiple images already inputted to a terminal, and respective description texts matching scenarios corresponding to the multiple images are generated. Then, keyword-based rhyme matching is performed on the description text matching the scenario corresponding to each image, and respective rhyming lyrics corresponding to the multiple images are generated. Next, the respective rhyming lyrics corresponding to the multiple images are converted into a speech. Finally, the speech is synthesized with preset background music to generate image music. In the embodiments of this application, image music can be generated as long as a terminal provides multiple images. Scenarios of the multiple images are recognized, description texts adaptive to the scenarios are obtained through automatic matching, and then rhymes are designed for the description texts of the scenarios. In this way, generated rhyming lyrics conform to music characteristics. Further, the rhyming lyrics are converted into a speech. Finally, the rhyming lyrics are synthesized with background music, thus forming a piece of image music. The rhyming lyrics in the image music are generated according to the images inputted to the terminal. Therefore, the outputted image music can be closely associated with image materials provided by a user. Thus, music that matches description texts of scenarios can be automatically generated by using inputted images.

The method and apparatus for generating music are described separately in the following. The embodiments of this application may be applied to a terminal. In the embodiments of this application, the terminal may be a personal computer (PC), a mobile terminal, a tablet computer, or the like capable of generating music.

Figure 1:
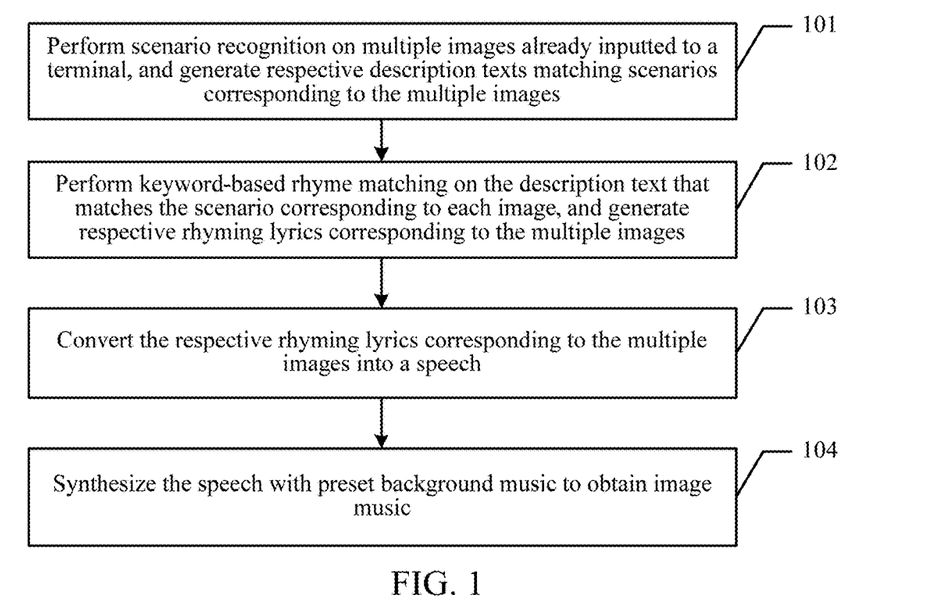
FIG. 1 is a schematic block flowchart of a method for generating music according to an embodiment of this application.

An embodiment of a method for generating music according to this application may be specifically configured to generate, based on multiple images inputted by a user, music that matches description texts of the images. Referring to FIG. 1, a method for generating music provided in an embodiment of this application includes the following steps:

101: Perform scenario recognition on multiple images already inputted to a terminal, and generate respective description texts matching scenarios corresponding to the multiple images.

In this embodiment of this application, a user in a terminal may input multiple images for generating image music. The image music described in this embodiment of this application refers to rhythmic music adaptive the multiple images inputted by the user. The multiple images inputted in the terminal may be stored by the user in the terminal in advance, or may be acquired by the user in real time by using a camera of the terminal. For example, the multiple images may be acquired by the terminal after entering a photographing mode; or the multiple images may be obtained from a photo album of the terminal. Implementations of the multiple images already inputted to the terminal are not limited.

In this embodiment of this application, scenario recognition may be performed on the multiple images already inputted to the terminal, so as to recognize a scenario corresponding to each image. For example, classification of image scenarios may be implemented in many manners. For example, there are mainly four types of scenarios: scenery, people, food, and selfie. Image scenario recognition is performed according to pictures uploaded by a user. A scenario of each image is recognized, and texts that can describe scenarios corresponding to different images are obtained for each image through automatic matching. For example, scenario recognition is performed on the multiple images. For example, there are blue sky and birds on an image. In this case, a description text "小鸟在蓝天上翱翔" (Chinese pinyin: xiao3 niao3 zai4 lan2 tian1 shang4 ao2 xiang2, meaning birds are flying in the blue sky) is automatically provided after scenario recognition.

In some embodiments of this application, step 101 of performing scenario recognition on multiple images already inputted to the terminal, and generating respective description texts matching scenarios corresponding to the multiple images includes the following steps:

A1: performing scenario recognition on the multiple images according to a deep learning neural network model to obtain recognized image features, and determining the respective scenarios corresponding to the multiple images according to the image features; and

A2: generating image descriptions according to the recognized image features and the respective scenarios corresponding to the multiple images, to obtain the respective description texts matching the scenarios corresponding to the multiple images.

In this embodiment of this application, scenario recognition may be performed on the multiple images by using a deep learning neural network model. The deep learning neural network model may also be referred to as a neural image annotation model. Image features may be recognized by using the deep learning neural network model, and the scenarios corresponding to the multiple images are determined according to the image features. Image recognition refers to a technology of processing, analyzing, and understanding images by using a computer, so as to recognize targets and objects of various different modes. Next, image descriptions are generated according to the recognized image features and the scenarios corresponding to the multiple images, to obtain the respective description texts matching the scenarios corresponding to the multiple images. An image scenario is recognized by using a deep learning neural network, and a related description text is automatically matched up with the scenario. Generating of image description means extracting, based on computer vision, an image feature by using a scenario and object class information as prior knowledge, and synergistically generating an image description sentence integrating the scenario and the object class.

102: Perform keyword-based rhyme matching on the description text that matches the scenario corresponding to each image, and generate respective rhyming lyrics corresponding to the multiple images.

In this embodiment of this application, the description text matching the scenario corresponding to each image may be generated through scenario recognition. The description text matching the scenario corresponding to each image is a basis for further generating lyrics. Rhymes of the text may be designed by using the description text matching the scenario of each image. Rhyming lyrics may be generated for each image. The rhyming lyrics refer to a verse that rhymes. The rhyming lyrics corresponding to each image may be a line of lyrics, or two or more lines of lyrics.

In some embodiments of this application, step 102 of performing keyword-based rhyme matching on the description text that matches the scenario corresponding to each image, and generating respective rhyming lyrics corresponding to the multiple images includes:

B1: obtaining, from the description text matching the scenario corresponding to each image, Chinese pinyin and a rhyme corresponding to a last word in the description text; and

B2: generating the rhyming lyrics corresponding to the multiple images according to the Chinese pinyin and the rhymes corresponding to the last words in the description texts, where the rhyming lyrics corresponding to each image have the same rhyme as the last word in the description text matching the scenario corresponding to the image.

In the description text matching the scenario corresponding to each image, Chinese pinyin and a rhyme corresponding to a last word in the description text may be obtained. In Chinese characters, there are less than 8000 commonly used Chinese characters. Therefore, a Pinyin table of commonly used Chinese characters may be generated in advance. An index is created according to the characters and is loaded into a memory. Pinyin of a Chinese character may be obtained as required. By searching a final table, it can be learned that there are 35 finals. All the finals may be put into an array, and sorted in descending order of final lengths. Then, a character string is sequentially compared with the finals, to obtain a rhyme corresponding to the last word. After the Chinese pinyin and the rhymes corresponding to the last words in the description texts are obtained, rhyming lyrics corresponding to the multiple images are generated based on the Chinese pinyin and rhymes corresponding to the last words in the description texts. The rhyming lyrics corresponding to each image have the same rhyme as the last word in the description text matching the scenario corresponding to the image. Therefore, the rhyme of the rhyming lyrics that can be generated may come from the rhyme of the last word in the description text. The design of the same rhyme can ensure that the generated rhyming lyrics corresponding to the multiple images have harmonious and uniform rhymes and sound catchier.

Further, in some embodiments of this application, step B2 of generating the rhyming lyrics corresponding to the multiple images according to the Chinese pinyin and the rhymes corresponding to the last words in the description texts includes:

B21: arranging all finals in the Chinese pinyin corresponding to the last words in the description texts;

B22: determining a final distribution rule according to all the finals arranged;

B23: determining the rhymes corresponding to the last words in the description texts from finals meeting the final distribution rule; and

B24: obtaining the rhyming lyrics corresponding to the multiple images from pre-generated lyrics patterns according to the scenarios corresponding to the multiple images and the rhymes corresponding to the scenarios, lyrics texts corresponding to multiple scenarios and multiple rhymes being preconfigured in the lyrics patterns.

A description text is matched up with the scenario corresponding to each image in the multiple images. The description texts each include a last word. Therefore, all possible finals may be arranged according to the Chinese pinyin of the multiple last words. For each final, different description text sentences corresponding to different scenarios are generated in advance as a lyrics pattern, a final distribution rule of last words in description texts is found by using data samples of multiple description texts. Finals that are distributed most frequently are found. The amount of data for such finals is increased, thereby determining which final is used as the rhyme. A lyrics pattern is searched for based on the rhyme selected according to the final distribution rule, and rhyming lyrics corresponding to the multiple images may be obtained by using the lyrics pattern.

An example is described as follows. In an example of generating rhyming lyrics of rap music, corresponding rap scripts may be generated as lyrics patterns for different rhymes of different scenarios, and more optional scripts are generated for a high-frequency rhyme. Then, a matching script is randomly selected according to a rhyme and a scenario, to generate rhyming lyrics of rap music. The same rap script is generated for the same rhyme. When some rhymes appear frequently, more lyrics patterns may be generated for the high-frequency rhymes, so that rhyming lyrics can be generated from multiple lyrics patterns.

Further, in some embodiments of this application, step B24 of obtaining the rhyming lyrics corresponding to the multiple images from pre-generated lyrics patterns according to the scenarios corresponding to the multiple images and the rhymes corresponding to the scenarios includes:

B241: generating image description lyrics according to the description text matching the scenario corresponding to each image;

B242: obtaining supplementary lyrics from the pre-generated lyrics patterns according to the scenarios corresponding to the multiple images and the rhymes corresponding to the scenarios; and

B243: synthesizing the image description lyrics with the supplementary lyrics, to obtain the rhyming lyrics.

Specifically, in the foregoing embodiment of this application, the description text matching the scenario corresponding to each image may be used as image description lyrics. The image description lyrics refer to lyrics from the description text. For example, the description text may be "小鸟在蓝天上翱翔" (Chinese pinyin: xiao3 niao3 zai4 lan2 tian1 shang4 ao2 xiang2, meaning birds are flying in the blue sky). The description text may be used as image description lyrics. In step B242, supplementary lyrics may further be obtained. The supplementary lyrics and the image description lyrics may be generated simultaneously. The supplementary lyrics refer to lyrics obtained from a lyrics pattern. The supplementary lyrics and the image description lyrics may have the same rhyme. Finally, the image description lyrics and the supplementary lyrics may be synthesized to obtain the rhyming lyrics. For example, the description text may be supplemented in a rhyming manner. For example, if the image description lyrics are "小鸟在蓝天上翱翔" (Chinese pinyin: xiao3 niao3 zai4 lan2 tian1 shang4 ao2 xiang2, meaning birds are flying in the blue sky), supplementary lyrics having the same rhyme as the image lyrics may be found from the lyrics patterns. The supplementary lyrics may be "差不多的好，差不多的赞" (Chinese pinyin: cha4 bu5 duo1 de5 hao3, cha4 bu5 duo1 de5 zan4, meaning they are equally pretty). Therefore, the finally generated rhyming lyrics in this embodiment of this application may be: 小鸟在蓝天上翱翔；差不多的好，差不多的赞 (Chinese pinyin: xiao3 niao3 zai4 lan2 tian1 shang4 ao2 xiang2; cha4 bu5 duo1 de5 hao3, cha4 bu5 duo1 de5 zan4, meaning birds are flying in the blue sky, and they are equally pretty).

Further, in some embodiments of this application, step B242 of obtaining supplementary lyrics from the pre-generated lyrics patterns according to the scenarios corresponding to the multiple images and the rhymes corresponding to the scenarios includes:

obtaining a double-rhyme according to the image description lyrics; and obtaining supplementary lyrics from the pre-generated lyrics patterns according to the scenarios corresponding to the multiple images and the double-rhyme corresponding to the scenarios.

In this embodiment of this application, when rhymes are obtained according to the image description lyrics, a double-rhyme may further be determined. A double-rhyme is a rhyme with two rhyming characters. The supplementary lyrics can be obtained from the lyrics patterns based on the scenarios and the double-rhyme. The supplementary lyrics are generated in a double-rhyme manner, so that the supplementary lyrics and the image description lyrics have the same double-rhyme.

103: Convert the respective rhyming lyrics corresponding to the multiple images into a speech.

In this embodiment of this application, after the rhyming lyrics corresponding to the multiple images are obtained, the rhyming lyrics may be converted from a text into a speech. Specifically, all the rhyming lyrics obtained in step 102 may be converted into a speech by means of txt-to-speech (TTS) conversion.

In some embodiments of this application, step 103 of multiple images converting the respective rhyming lyrics corresponding to the multiple images into a speech includes:

C1: performing text analysis on the respective rhyming lyrics corresponding to the multiple images, to obtain a text analysis result;

C2: extracting a linguistic feature from the text analysis result;

C3: performing phoneme-level duration prediction and adaptive duration adjustment according to the linguistic feature, to obtain a rhythm feature and a part-of-speech feature corresponding to the rhyming lyrics; and C4: generating pronunciations by using a neural network model based on the linguistic feature as well as the rhythm feature and the part-of-speech feature that match the rhyming lyrics, to obtain the speech.

For the respective rhyming lyrics corresponding to each image, text analysis may be performed first, to provide information for subsequent feature extraction. The obtained text analysis result may be mainly used for generating pronunciations, predicting rhythms, predicting parts of speech, and the like. After the text analysis result is obtained, a linguistic feature is extracted from the result and is converted into an input vector of a neural network model. Next, phoneme-level duration prediction and adaptive duration adjustment may be performed by using a duration model. In this embodiment of this application, the generated rhyming lyrics are different from ordinary speaking, and are rhythmic. Therefore, the duration prediction result is adjusted adaptively, so that each character is on the beat while the original pronunciation remains unchanged. Finally, based on the linguistic feature as well as the rhythm feature and the part-of-speech feature that match the rhyming lyrics, pronunciations are generated by using the neural network model, to obtain the speech.

104: Synthesize the speech with preset background music to obtain image music.

In this embodiment of this application, after the rhyming lyrics are converted into the speech through step 103, the speech may include content of the rhyming lyrics. Then, the speech is combined with background music to generate final image music. The image music is obtained by synthesizing the rhyming lyrics compiled according to the multiple images inputted by the user with the background music. Therefore, when the image music is played, the user can hear a piece of rhythmic music with lyrics. For example, after rap rhyming lyrics are compiled according to multiple images, the rap rhyming lyrics are synthesized with rap background music, thus completing text-to-rap (TTR) conversion.

It can be learned from the illustration of this application in the foregoing embodiment that, first of all, scenario recognition is performed on multiple images already inputted to a terminal, and respective description texts matching scenarios corresponding to the multiple images are generated. Then, keyword-based rhyme matching is performed on the description text matching the scenario corresponding to each image, and respective rhyming lyrics corresponding to the multiple images are generated. Next, the respective rhyming lyrics corresponding to the multiple images are converted into a speech. Finally, the speech is synthesized with preset background music to generate image music. In this embodiment of this application, image music can be generated as long as a terminal provides multiple images. Scenarios of the multiple images are recognized, description texts adaptive to the scenarios are obtained through automatic matching, and then rhymes are designed for the description texts of the scenarios. In this way, generated rhyming lyrics conform to music characteristics. Further, the rhyming lyrics are converted into a speech. Finally, the rhyming lyrics are synthesized with background music, thus forming a piece of image music. The rhyming lyrics in the image music are generated according to the images inputted to the terminal. Therefore, the outputted image music can be closely associated with image materials provided by a user. Thus, music that matches description texts of scenarios can be automatically generated by using inputted images.

To facilitate better understanding and implementation of the foregoing solution in the embodiments of this application, a specific description is made below by using a corresponding application scenario as an example.

In this embodiment of this application, a song may be composed through Artificial Intelligence (AI), which is a prospective attempt and provides reference value for the application of AI in a larger scenario. In the following, generating of rap music is used as an example. TTR means conversion from a text into rap music, which mainly includes recognizing scenarios of multiple inputted images, then providing a description text conforming to each of the scenarios, designing rhymes of subtitles according to image content-based recognition, and finally converting the description texts for the scenarios into a speech through TTS. Subsequently, background music with a specific rhythm is added. The background music is synthesized with the text speech seamlessly to complete a piece of rap music. Finally, a piece of beautiful music with a rap characteristic is generated. In TTR, a scenario of any inputted image is recognized and a description text is provided. Through a series of processing, the description is converted into rap music. Composing songs by using AI is a prospective attempt and provides reference value for the application of AI in a larger scenario.

This embodiment of this application mainly includes recognizing scenarios of multiple inputted images, and finally combining the multiple inputted images into a music video (MV) accompanied with rap music. A user inputs multiple images from an applet on a mobile phone client. After the multiple images are uploaded, image scenarios are recognized by using a deep learning neural network model, and related description texts of the scenarios are obtained through automatic matching. Then, rhymes of the related description texts are designed through image content recognition. Finally, the rhyming texts are converted into a speech through a TTS technology.

Figure 2:
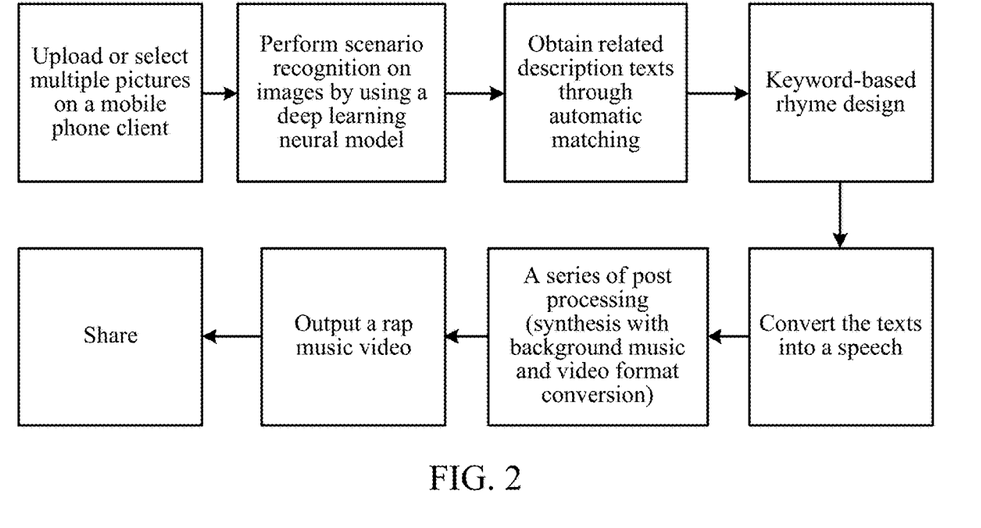
FIG. 2 is a schematic flowchart of generating rap music according to an embodiment of this application.

FIG. 2 is a schematic flowchart of generating rap music according to an embodiment of this application. This system mainly includes four parts:

1. A user uploads or selects multiple images from a mobile phone client. The images inputted by the user are obtained.
2. Recognize image scenarios. Scenarios of the multiple inputted images are recognized, and related description texts are provided.
3. Design rhymes. Rhymes of the related description texts are designed.
4. Convert texts into a speech. The rhyming description texts are converted into a speech.

When a user submits multiple images on a mobile phone client, the multiple inputted images are recognized. Then, scenarios of the inputted images are recognized, and description texts adaptive to the scenarios are obtained through automatic matching. Next, rhymes are designed and supplemented according to the rhymes of the description texts. This is an AI algorithm. A description text is directly provided according to an inputted picture, that is, a scenario of the picture is determined directly. For example, there are birds flying in the blue sky, or someone is on the beach. Further, the texts are converted into a speech through TTS, and a piece of rap music is generated through subsequent processing.

Figure 3:
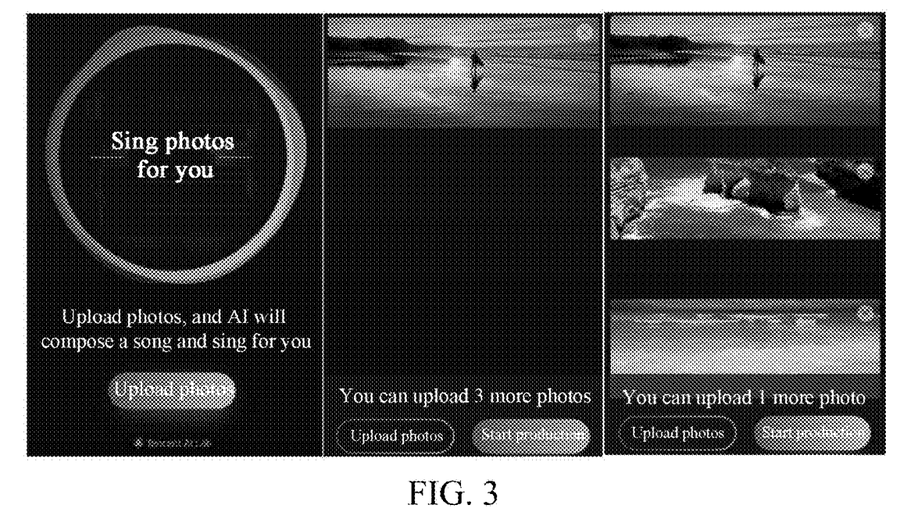
FIG. 3 is a schematic diagram of uploading multiple images at a client according to an embodiment of this application.

Next, each part is separately described by way of example. FIG. 3 is a schematic diagram of uploading multiple images by a user from a mobile phone client. The user takes multiple pictures or selects multiple pictures in the mobile phone, and uploads the pictures from the mobile phone client. In an example of uploading images from a mobile phone client, when a user clicks an "upload image" button, two optional modes appear: one is a "photographing" mode, and the other is a mode of "selecting from a mobile phone photo album". Multiple pictures may be selected and uploaded each time.

Next, image scenarios are recognized, and texts are matched automatically. Image scenarios are recognized according to the pictures uploaded by the user. A scenario of each image is recognized, and a text is matched up with each image automatically. Then, texts corresponding to all the images are connected. Text annotations are generated for the inputted images, and a success rate thereof can be maximized by training a neural image annotation model. Novel image descriptions can be generated. For example, the following annotation may be generated: a gray-suited man waves a stick, and a black-suited man looks on him. For another example, the following annotation may be generated: a bus "sits" beside a person.

Then, text rhyme design method provided in this embodiment of this application is illustrated. This application relates to the application field of generating an AI image item description, and in particular, to a keyword-based rhyme matching method. The main process is as follows:

1. Obtain text information generated from image descriptions, to obtain Chinese pinyin corresponding to Chinese characters, and rhymes.
2. Arrange all possible finals according to the Chinese pinyin, generate multiple description text sentences corresponding to different scenarios for each final in advance, implement double rhyming in the same sentence, and supplement the second sentence of lyrics in this manner. The pre-generating manner is as follows: listing all possible finals in Chinese pinyin. Rhyming lyrics corresponding to four classes of scenarios, that is, "scenery", "people", "selfie", and "food", are generated for each final.
3. Find a final distribution rule of description texts through data samples, find finals that are distributed most frequently, and increase the amount of data for such finals.
4. Generate and capture scenarios according to the image descriptions and the text descriptions, matching up rhyming materials with the scenarios according to finals of characters generated from the text descriptions.
5. Finally, technically present a complete composition with rhyming lyrics.

In this technical solution, pictures uploaded by a user are converted into texts based on an image recognition technology and an image description generating technology, and a random second sentence of lyrics is obtained through matching according to a final of the last word of the first sentence generated from an image description and an image scenario. Finally, rhyming lyrics are generated. Then, the rhyming lyrics are made into a song and sung through AI, thus forming a complete interaction process of uploading pictures by a user and composing lyrics and singing based on AI. Therefore, it is much more interactive and interesting. It means that multiple words in the lyrics can be used for matching.

First of all, image descriptions are generated and obtained. According to photos uploaded by a user, image description information is obtained by using an AI image description generating technology. A description sentence is obtained for each picture.

Then, Chinese pinyin is obtained. There are less than 8000 Chinese characters. A Pinyin table of commonly used Chinese characters is generated in advance. An index is created according to the characters and is loaded into a memory. When Pinyin of a Chinese character needs to be obtained, Pinyin can be quickly obtained within a time of O(1).

An example is described as follows:

阿 a1, 啊 a1, 呵 a1, 腌 a1, a1, a1, 啊 a2, 呵 a2, 嗄 a2, 啊 a3 呵 a3, 啊 a4, 呵 a4, 阿 a5, 啊 a5, 呵 a5, 哀 ai1, 挨 ai1, 埃 ai1, 唉 ai1, 尊 zun1, 遵 zun1, 樽 zun1, 鳟 zun1, 撙 zun3, 作 zuo1, 嘬 zuo1, 作 zuo2, 昨 zuo2, 琢 zuo2, 笮 zuo2, 左 zuo3 佐 zuo3, 撮 zuo3, 作 zuo4, 做 zuo4, 坐 zuo4, 座 zuo4, 凿 zuo4, 柞 zuo4, 怍 zuo4, 胙 zuo4, 阼 zuo4, 唑 zuo4, 祚 zuo4, 酢 zuo4.

Next, rhymes are obtained. It can be learned by searching the final table that, there are 35 finals. Using the Chinese character "变" (Pinyin: bian4) as an example, a three-letter final includes a compound final and a single final. For example, ian includes a final i and a final an. Therefore, the finals are obtained in the following sequence: three-letter final, compound final, and single final. In an implementation, all finals are put into an array and are sorted in descending order of final lengths. Then, a character string is sequentially compared with the finals.

Image description scenarios are obtained. Keywords in scenarios are obtained through matching according to texts of the image descriptions, so as to distinguish the corresponding scenarios. Currently, there are mainly four classes of scenarios: scenery, people, food, and selfie. The following are some of corresponding keywords.

Examples are described as follows: When the scenario is scenery, there may be multiple description texts, for example, scenery-sunshine, scenery-sea, scenery-rain, scenery-flower, and scenery-grass. When the scenario is people, there may be multiple description texts, for example, people-boy, and people-girl. When the scenario is food, there may be multiple description texts, for example, food-gourmet. When scenario is selfie, there may be multiple description texts, for example, selfie-picture, selfie-avatar.

Then, supplementary lyrics are obtained according to the scenarios and the rhymes. First of all, corresponding rap scripts are generated for different rhymes of different scenarios. More optional scripts are generated for high-frequency rhymes. Then, a matching script is selected randomly according to the rhyme and the scenario.

Examples are described as follows:
- a scenery 差不多的话，有差不多的牵挂 (Chinese Pinyin: cha4 bu5 duo1 de5 hua4, you3 cha4 bu5 duo1 de5 qian1 gua4, meaning: almost the same word expressing almost the same care)
- a people 差不多的大，有差不多的羡煞 (Chinese Pinyin: cha4 bu5 duo1 de5 da4, you3 cha4 bu5 duo1 de5 xian4 sha4, meaning: almost the same size causing almost the same envy)
- a food 差不多的炸，有差不多的火辣 (Chinese Pinyin: cha4 bu5 duo1 de5 zha4, you3 cha4 bu5 duo1 de5 huo3 la4, meaning: fried in almost the same way, almost equally spicy)
- ia gourmet 差不多的虾，有差不多的惊吓 (Chinese Pinyin: cha4 bu5 duo1 de5 xia1, you3 cha4 bu5 duo1 de5 jing1 xia4, meaning: almost the same shrimp, almost the same shock)
- ia people 差不多的融洽，有差不多的我们俩 (Chinese Pinyin: cha4 bu5 duo1 de5 rong2 qia4, you3 cha4 bu5 duo1 de5 wo3 men5 lia3, meaning: we two are getting along well with each other)
- ia food 差不多的家，有差不多的晚霞 (Chinese Pinyin: cha4 bu5 duo1 de5 jia1, you3 cha4 bu5 duo1 de5 wan3 xia2, meaning: our homes are similar, and we enjoy almost the same sunset)
- ua scenery 差不多的野花，有差不多的关如画 (Chinese Pinyin: cha4 bu5 duo1 de5 ye3 hua1, you3 cha4 bu5 duo1 de5 mei3 ru2 hua4, meaning: similar wild flowers make similar beautiful scenery)
- ua people 差不多的话，有差不多的八卦 (Chinese Pinyin: cha4 bu5 duo1 de5 hua4, you3 cha4 bu5 duo1 de5 ba1 gua4, meaning: similar wild words make similar gossips)
- ce general 差不多的失落，有差不多的在鞭策 (Chinese Pinyin: cha4 bu5 duo1 de5 shi1 luo4, you3 cha4 bu5 duo1 de5 zai4 bian1 ce4, meaning: similar disappointments spur us all)
- che scenery 差不多的河，有差不多的清澈 (Chinese Pinyin: cha4 bu5 duo1 de5 he2, you3 cha4 bu5 duo1 de5 qing1 che4, meaning: similar rivers look equally clear)
- ge gourmet 差不多的馋，有差不多的乳鸽 (Chinese Pinyin: cha4 bu5 duo1 de5 chan2, you3 cha4 bu5 duo1 de5 ru3 ge1, meaning: we both fond of roast pigeons)
- re scenery 差不多的晒，有差不得的炎热 (Chinese Pinyin: cha4 bu5 duo1 de5 shai4, you3 cha4 bu5 duo1 de5 yan2 re4, meaning: almost the same burning sunlight gives us almost the same heat)
- te people 差不多的表白，有差不多的在忐忑 (Chinese Pinyin: cha4 bu5 duo1 de5 biao3 bai2, you3 cha4 bu5 duo1 de5 tan3 te4, meaning: similar confessions, and similar nervousness)
- ye general 差不多的深夜，是差不多的在哽咽 (Chinese Pinyin: cha4 bu5 duo1 de5 shen1 ye4, shi4 cha4 bu5 duo1 de5 zai4 geng3 ye4, meaning: people alike sob late at night)
- ze general 差不多的人生，是差不多的做选择 (Chinese Pinyin: cha4 bu5 duo1 de5 ren2 sheng1, shi4 cha4 bu5 duo1 de5 zuo1 xuan3 ze4, meaning: almost the same life, almost the same choice)
- he scenery 差不多的河，有差不多的隔阂 (Chinese Pinyin: cha4 bu5 duo1 de5 he2, you3 cha4 bu5 duo1 de5 ge2 he2, meaning: similar rivers cause similar barriers)
- ke people 差不多的客，有差不多的苛刻 (Chinese Pinyin: cha4 bu5 duo1 de5 ke4, you3 cha4 bu5 duo1 de5 ke1 ke4, meaning: similar customers are almost equally harsh)
- ke food 差不多的喝，有差不多的口渴 (Chinese Pinyin: cha4 bu5 duo1 de5 he1, you3 cha4 bu5 duo1 de5 kou3 ke3, meaning: we drink alike because we are almost equally thirsty)

The finally generated rhyming lyrics may be as follows:
- 一群人走在，繁华的街道上 (Chinese Pinyin: yi1 qun2 ren2 zou3 zai4 fan2 hua2 de5 jie1 dao4 shang4, meaning: a group of people walking on the street) [image description]
- 差不多的忙，有差不多的遗忘 (Chinese Pinyin: cha4 bu5 duo1 de5 mang2, you3 cha4 bu5 duo1 de5 yi2 wang4, meaning: we are all busy and forget about the old days) [supplementary lyrics]
- 城市中的高楼大厦 (Chinese Pinyin: cheng2 shi4 zhong1 de5 gao1 lou2 da4 sha4, meaning: skyscrapers in the city) [image description]
- 差不多的景，有差不多的牵挂 (Chinese Pinyin: cha4 bu5 duo1 de5 jing3, you3 cha4 bu5 duo1 de5 qian1 gua4, meaning: we see almost the same scenery and have almost the same care) [supplementary lyrics]
- 和朋友聚 餐时的美食照片 (Chinese Pinyin: he2 peng2 you3 ju4 can1 shi2 de5 mei3 shi4 zhao4 pian1, meaning: photos of gourmet food on the party with friends) [image description]
- 差不多的脸，有差不多的想念 (Chinese Pinyin: cha4 bu5 duo1 de5 lian3, you3 cha4 bu5 duo1 de5 xiang3 nian4, meaning: looking at the similar faces, we all miss each other) [supplementary lyrics]

Figure 4:
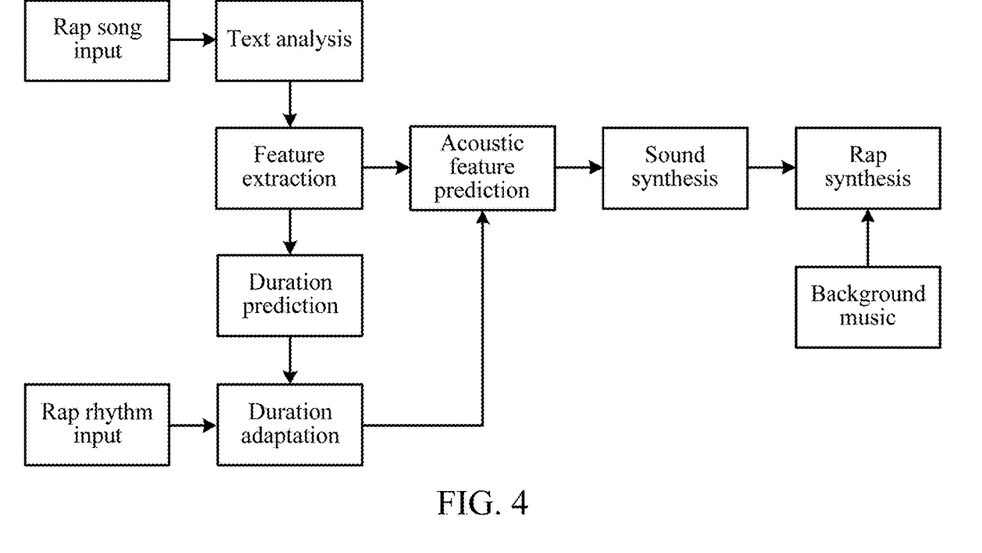
FIG. 4 is a schematic flowchart of converting rhyming lyrics into a speech according to an embodiment of this application.

Finally, conversion from the texts to a speech is described by way of example. As shown in FIG. 4, text analysis is performed on the description texts, to provide information for subsequent feature extraction. The text analysis mainly includes: pronunciation generating, rhythm prediction, part-of-speech prediction, and the like. After the text analysis result is obtained, a linguistic feature is extracted from the result and is converted into an input vector of a neural network model. Phoneme-level duration prediction is performed by using a duration model. Phonemes are predicted by using the duration model, so that a better rhythm can be obtained. Rap music is different from ordinary speaking, and is rhythmic. Therefore, the duration prediction result is adjusted adaptively. Duration adaptation means automatic adjustment by using a neural network, so that each character is on the beat while the original pronunciation remains unchanged. A rap input refers to description texts. Acoustic feature prediction includes: rhythm prediction and part-of-speech prediction. A rap rhythm in a rap rhythm input is obtained through neural network prediction. Background music may have a relatively fast rhythm. Rap lyrics are obtained by recognizing scenarios of images to obtain description texts and designing rhymes of the description texts.

For ease of description, the foregoing method embodiments are described as a series of action combinations. However, it is to be appreciated by a person skilled in the art that, this application is not limited to the described sequence of the actions, because some steps may be performed in another sequence or performed at the same time according to this application. In addition, it is also to be appreciated by a person skilled in the art that, the embodiments described in this specification all belong to exemplary embodiments, and the involved actions and logical components are not necessarily mandatory to this application.

To facilitate implementation of the foregoing solution in the embodiments of this application, the following further provides a related apparatus configured to implement the foregoing solution.

Figure 5A:
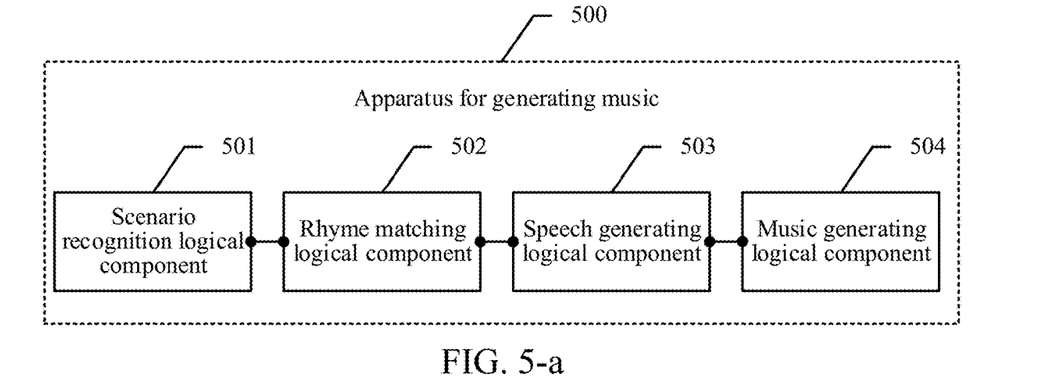

As shown in FIG. 5-a, an apparatus 500 for generating music provided in an embodiment of this application may include: a scenario recognition logical component 501, a rhyme matching logical component 502, a speech generating logical component 503, and a music generating logical component 504, where the scenario recognition logical component 501 is configured to perform scenario recognition on multiple images already inputted to a terminal, and generate respective description texts matching scenarios corresponding to the multiple images;

the rhyme matching logical component 502 is configured to perform keyword-based rhyme matching on the description text that matches the scenario corresponding to each image, and generate respective rhyming lyrics corresponding to the multiple images;

the speech generating logical component 503 is configured to convert the respective rhyming lyrics corresponding to the multiple images into a speech; and the music generating logical component 504 is configured to synthesize the speech with preset background music to obtain image music.

Figure 5B:
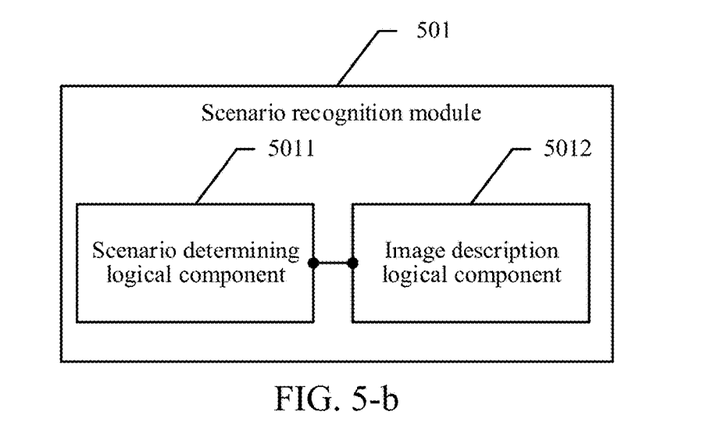

In some embodiments of this application, as shown in FIG. 5-b, the scenario recognition logical component 501 includes:

a scenario determining logical component 5011, configured to perform scenario recognition on the multiple images according to a deep learning neural network model to obtain recognized image features, and determine the respective scenarios corresponding to the multiple images according to the image features; and an image description logical component 5012, configured to generate image descriptions according to the recognized image features and the respective scenarios corresponding to the multiple images, to obtain the respective description texts matching the scenarios corresponding to the multiple images.

Figure 5C:
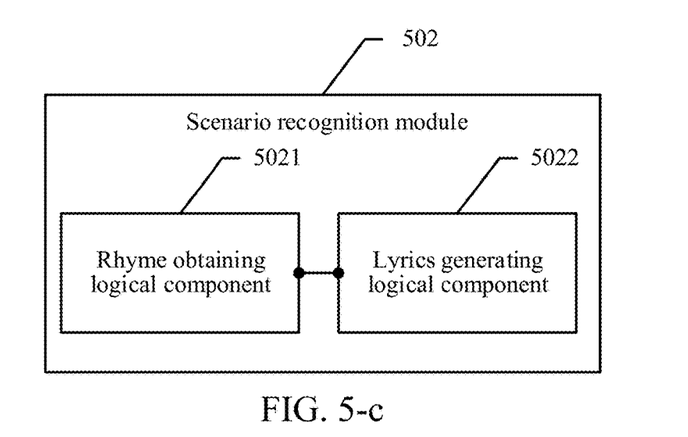

In some embodiments of this application, as shown in FIG. 5-c, the rhyme matching logical component 502 includes:

a rhyme obtaining logical component 5021, configured to obtain, from the description text matching the scenario corresponding to each image, Chinese pinyin and a rhyme corresponding to a last word in the description text; and a lyrics generating logical component 5022, configured to generate the rhyming lyrics corresponding to the multiple images according to the Chinese pinyin and the rhymes corresponding to the last words in the description texts, where the rhyming lyrics corresponding to each image have the same rhyme as the last word in the description text matching the scenario corresponding to the image.

Figure 5D:
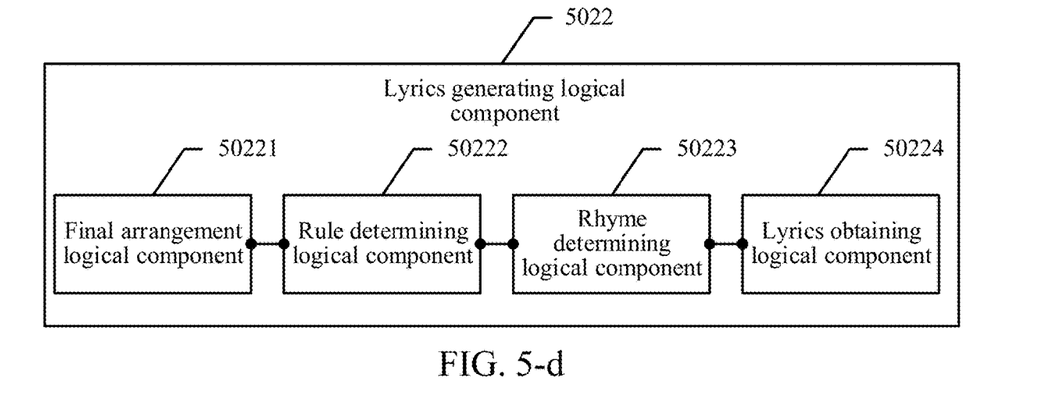

In some embodiments of this application, as shown in FIG. 5-d, the lyrics generating logical component 5022 includes:

a final arrangement logical component 50221, configured to arrange all finals in the Chinese pinyin corresponding to the last words in the description texts;

a rule determining logical component 50222, configured to determine a final distribution rule according to all the finals arranged;

a rhyme determining logical component 50223, configured to determine the rhymes corresponding to the last words in the description texts from finals meeting the final distribution rule; and a lyrics obtaining logical component 50224, configured to obtain the rhyming lyrics corresponding to the multiple images from pre-generated lyrics patterns according to the scenarios corresponding to the multiple images and the rhymes corresponding to the scenarios, lyrics texts corresponding to multiple scenarios and multiple rhymes being preconfigured in the lyrics patterns.

Figure 5E:
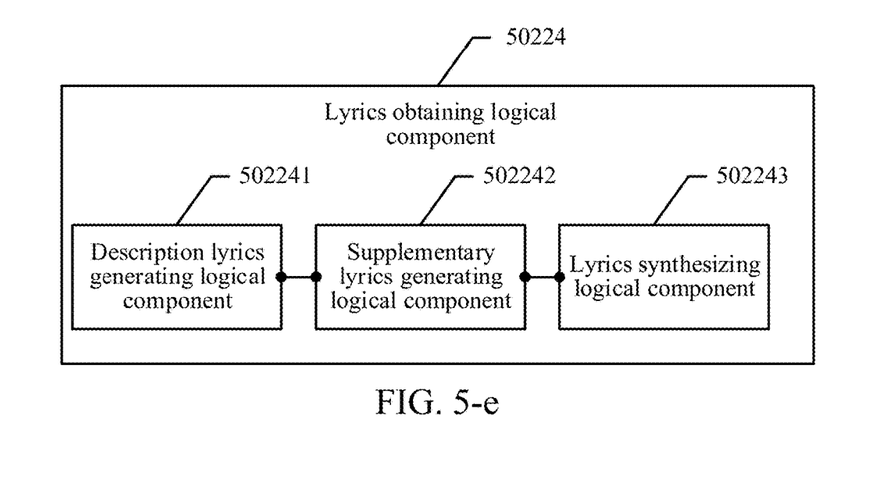

In some embodiments of this application, as shown in FIG. 5-e, the lyrics obtaining logical component 50224 includes:

a description lyrics generating logical component 502241, configured to generate image description lyrics according to the description text matching the scenario corresponding to each image;

a supplementary lyrics generating logical component 502242, configured to obtain supplementary lyrics from the pre-generated lyrics patterns according to the scenarios corresponding to the multiple images and the rhymes corresponding to the scenarios; and a lyrics synthesizing logical component 502243, configured to synthesize the image description lyrics with the supplementary lyrics, to obtain the rhyming lyrics.

In some embodiments of this application, the multiple images are acquired by the terminal after entering a photographing mode; or the multiple images are obtained from a photo album of the terminal.

Figure 5F:
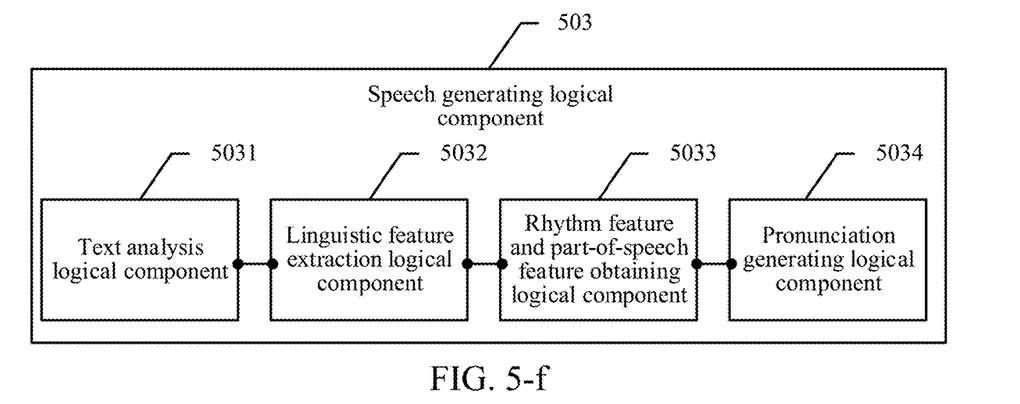

In some embodiments of this application, as shown in FIG. 5-f, the speech generating logical component 503 includes:

a text analysis logical component 5031, configured to perform text analysis on the respective rhyming lyrics corresponding to the multiple images, to obtain a text analysis result;

a linguistic feature extraction logical component 5032, configured to extract a linguistic feature from the text analysis result;

a rhythm feature and part-of-speech feature obtaining logical component 5033, configured to perform phoneme-level duration prediction and adaptive duration adjustment according to the linguistic feature, to obtain a rhythm feature and a part-of-speech feature corresponding to the rhyming lyrics; and a pronunciation generating logical component 5034, configured to generate pronunciations by using a neural network model based on the linguistic feature as well as the rhythm feature and the part-of-speech feature that match the rhyming lyrics, to obtain the speech.

It can be learned from the illustration of this application in the foregoing embodiment that, first of all, scenario recognition is performed on multiple images already inputted to a terminal, and respective description texts matching scenarios corresponding to the multiple images are generated. Then, keyword-based rhyme matching is performed on the description text matching the scenario corresponding to each image, and respective rhyming lyrics corresponding to the multiple images are generated. Next, the respective rhyming lyrics corresponding to the multiple images are converted into a speech. Finally, the speech is synthesized with preset background music to generate image music. In this embodiment of this application, image music can be generated as long as a terminal provides multiple images. Scenarios of the multiple images are recognized, description texts adaptive to the scenarios are obtained through automatic matching, and then rhymes are designed for the description texts of the scenarios. In this way, generated rhyming lyrics conform to music characteristics. Further, the rhyming lyrics are converted into a speech. Finally, the rhyming lyrics are synthesized with background music, thus forming a piece of image music. The rhyming lyrics in the image music are generated according to the images inputted to the terminal. Therefore, the outputted image music can be closely associated with image materials provided by a user. Thus, music that matches description texts of scenarios can be automatically generated by using inputted images.

Figure 6:
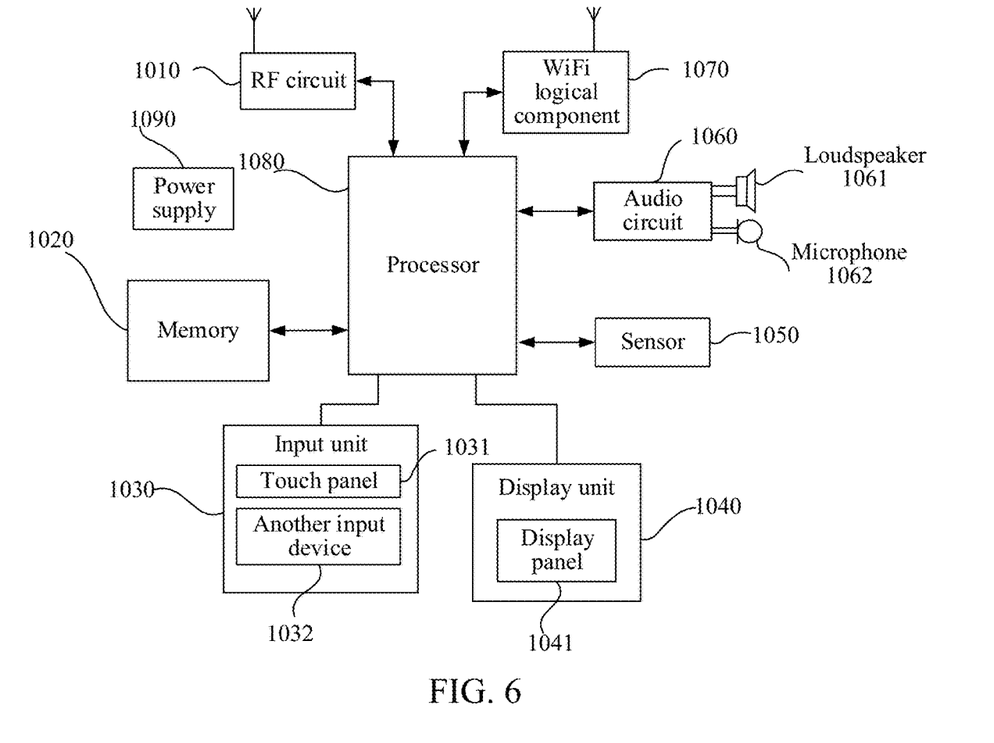
FIG. 6 is a schematic structural diagram of composition of a terminal to which a method for generating music is applied according to an embodiment of this application.

An embodiment of this application further provides a terminal, as shown in FIG. 6. For ease of description, only parts related to this embodiment of this application are shown. For specific details not disclosed, refer to the method part according to the embodiments of this application. The terminal may be any terminal device, including a mobile phone, a tablet computer, a personal digital assistant (PDA), a point of sales (POS), a vehicle-mounted computer, and the like. The terminal being a mobile phone is used as an example.

FIG. 6 is a block diagram of a partial structure of a mobile phone related to a terminal according to an embodiment of this application. Referring to FIG. 6, the mobile phone includes: a radio frequency (RF) circuit 1010, a memory 1020, an input unit 1030, a display unit 1040, a sensor 1050, an audio circuit 1060, a wireless fidelity (WiFi) logical component 1070, a processor 1080, a power supply 1090, and other components. A person skilled in the art may understand that the structure of the mobile phone shown in FIG. 6 does not limit the mobile phone, and the mobile phone may include more components or fewer components than those shown in the figure, or some components may be combined, or a different component deployment may be used.

The components of the mobile phone are described in detail below with reference to FIG. 6.

The RF circuit 1010 may be configured to receive and send a signal during an information receiving and sending process or a call process. Particularly, the RF circuit 1010 receives downlink information from a base station, then delivers the downlink information the processors 1080 for processing, and sends related uplink data to the base station. The RF circuit 1010 includes, but is not limited to, an antenna, at least one amplifier, a transceiver, a coupler, a low noise amplifier (LNA), a duplexer, and the like. In addition, the RF circuit 1010 may also communicate with a network and another device by wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 may be configured to store a computer executable instructions and/or a logical component. The processor 1080 runs the computer executable instructions and/or logical component stored in the memory 1020, to implement various functional applications and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1020 may include a high speed random access memory, and may also include a non-transitory computer readable medium such as a non-volatile memory, including, for example, at least one magnetic disk storage device, a flash memory, or another volatile solid storage device.

The input unit 1030 may be configured to receive input digit or character information, and generate a keyboard signal input related to user settings and function control of the mobile phone. Specifically, the input unit 1030 may include a touch panel 1031 and another input device 1032. The touch panel 1031 may also be referred to as a touch screen, and may collect a touch operation of a user on or near the touch panel (such as an operation of a user on or near the touch panel 1031 by using any suitable object or attachment, such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. Moreover, the touch controller can receive and execute a command sent from the processor 1080. In addition, the touch panel 1031 may be implemented by using various types, such as a resistive type, a capacitance type, an infrared type, and a surface acoustic wave type. In addition to the touch panel 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine a type of a touch event. Then, the processor 1080 provides corresponding visual output on the display panel 1041 according to the type of the touch event. Although, in FIG. 6, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050, such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, a gravity acceleration sensor may detect magnitude of accelerations at various directions (which generally include three axes), may detect magnitude and a direction of the gravity when static, and may be configured to identify an application of a mobile phone attitude (such as switchover between horizontal and vertical screens, a related game, and attitude calibration of a magnetometer), a function related to vibration identification (such as a pedometer and a knock). Other sensors, such as a gyroscope, a barometer, a hygrometer, a thermometer, and an infrared sensor, which may be configured in the mobile phone are not further described herein.

The audio circuit 1060, a loudspeaker 1061, and a microphone 1062 may provide audio interfaces between the user and the mobile phone. The audio circuit 1060 may transmit, to the loudspeaker 1061, a received electric signal converted from received audio data. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi belongs to a short distance wireless transmission technology. The mobile phone may help, by using the WiFi logical component 1070, the user to receive and send an e-mail, browse a webpage, access stream media, and the like, which provides wireless broadband Internet access for the user. Although FIG. 6 shows the WiFi logical component 1070, it may be understood that, the WiFi logical component is not a necessary component of the mobile phone, and can be omitted as required without changing the scope of the essence of the present disclosure.

The processor 1080 is a control center of the mobile phone, and connects to various parts of the mobile phone by using various interfaces and lines. By running or executing the computer executable instructions and/or logical component stored in the memory 1020, and invoking data stored in the memory 1020, the processor 1080 performs various functions and data processing of the mobile phone, thereby performing overall monitoring on the mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that, the foregoing modem processor may also not be integrated into the processor 1080.

The mobile phone further includes the power supply 1090 (such as a battery) for supplying power to various components. Preferably, the power supply may be logically connected to the processor 1080 by using a power supply management system, thereby implementing functions, such as charging, discharging, and power consumption management, by using the power supply management system.

Although not shown in the figure, the mobile phone may further include a camera, a Bluetooth logical component, and the like, which are not further described herein.

In this embodiment of this application, the processor 1080 included in the terminal further controls the foregoing method process performed by the terminal.

In addition, an embodiment of this application further provides a storage medium. The storage medium is configured to store program code. The program code is used for performing the method for generating method provided in the foregoing embodiment.

An embodiment of this application further provides a computer program product. The computer program product, when run on a terminal, causes the terminal to perform method for generating method provided in the foregoing embodiment.

The described apparatus embodiments are merely exemplary. The units described as separate parts may be physically separated or not, and the parts displayed as units may or may not be physical units, that is, they may be located in one location or distributed on a plurality of network units. Some or all of the logical components may be selected according to actual needs to achieve the objectives of the solutions of the embodiments. In addition, in the accompanying drawings of the apparatus embodiments in this application, the connection relationships between logical components represent existence of communicative connections between the logical components, and may be physically implemented as one or more communication buses or signal cables. A person of ordinary skill in the art may understand and implement the embodiments without creative efforts.

According to the descriptions of the foregoing implementations, a person skilled in the art can clearly understand that, this application may be implemented with logic comprising a hardware/software combination. Moreover, specific hardware structures for implementing logic are diverse, which may be, for example, an analog circuit, a digital circuit, and a dedicated circuit. Alternatively or in addition, the logic may be stored in a non-transitory computer-readable storage medium such as a computer floppy disk, a USB flash disk, a removable hard disk, a read-only memory (ROM), a random access memory (RAM), a magnetic disk, or an optical disc. The storage medium includes several instructions instructing a computer device (which may be a personal computer, a server, a network device, or the like) to perform the method in the embodiments of this application.

The logical components described herein may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for generating music, the method comprising:
identifying, by a terminal, based on execution of scenario recognition, scenarios for images previously received by the terminal;
generating respective description texts for the scenarios;
executing keyword-based rhyme matching based on the respective description texts;
generating respective rhyming lyrics corresponding to the images;
converting the respective rhyming lyrics corresponding to the images into a speech; and
synthesizing the speech with preset background music to obtain image music.

2. The method of claim 1, wherein the identifying, by the terminal, based on execution of scenario recognition, the scenarios for images previously received by the terminal further comprises:
obtaining image features for the images based on a deep learning neural network model; and
determining the scenarios for the images based on the image features.

3. The method of claim 2, wherein generating respective description texts for the scenarios further comprises:
generating image descriptions based on the image features and the scenarios for the images to obtain the respective description texts for the scenarios.

4. The method of claim 1, wherein executing keyword-based rhyme matching based on the respective description texts further comprises:
obtaining, from the respective description texts, Chinese pinyins and rhymes, the Chinese pinyins and rhymes corresponding to last words in the respective description texts; and
generating the respective rhyming lyrics corresponding to the images based on the Chinese pinyins and the rhymes, wherein the respective rhyming lyrics each have a same corresponding rhyme as the last word in the respective description text.

5. The method of claim 4, wherein obtaining the Chinese pinyins and rhymes and generating the respective rhyming lyrics corresponding to the images based on the Chinese pinyins and rhymes comprises:
arranging the Chinese pinyins corresponding to the last words in the description texts;
determining a distribution rule based on the arranged Chinese pinyins;
determining the rhymes based on the Chinese pinyins that satisfy the distribution rule; and
obtaining the respective rhyming lyrics corresponding to the images from pre-generated lyrics patterns based on the scenarios for the images and the rhymes.

6. The method of claim 5, wherein obtaining the respective rhyming lyrics corresponding to the images from pre-generated lyrics patterns based on the scenarios for the images and the rhymes comprises:
generating image description lyrics based on the respective description text;
obtaining supplementary lyrics from the pre-generated lyrics patterns based on the scenarios corresponding to the images and the rhymes; and
synthesizing the image description lyrics with the supplementary lyrics to obtain the rhyming lyrics.

7. The method of claim 1, wherein the images are acquired by the terminal in response to the terminal entering a photographing mode, or
the images are obtained from a photo album of the terminal.

8. The method of claim 1, wherein the converting the respective rhyming lyrics corresponding to the images into a speech further comprises:
executing text analysis on the respective rhyming lyrics corresponding to the images to obtain a text analysis result;
extracting a linguistic feature from the text analysis result;
executing phoneme-level duration prediction and adaptive duration adjustment based on the linguistic feature to obtain a rhythm feature and a part-of-speech feature corresponding to the rhyming lyrics; and
generating pronunciations based on a neural network model, the linguistic feature, the rhythm feature, and the part-of-speech feature to obtain the speech.

9. A terminal, comprising:
a processor, the processor configured to:
identify, based on execution of scenario recognition, scenarios for images previously received by the terminal;
generate respective description texts for the scenarios;
execute keyword-based rhyme matching based on the respective description texts;

generate respective rhyming lyrics corresponding to the images;

convert the respective rhyming lyrics corresponding to the images into a speech; and synthesize the speech with preset background music to obtain image music.

10. The terminal of claim 9, wherein to identify, based on execution of scenario recognition, the scenarios for images previously received by the terminal, the processor is further configured to:

obtain image features for the images based on a deep learning neural network model; and determine the scenarios for the images based on the image features.

11. The terminal of claim 10, wherein to generate respective description texts for the scenarios, the processor is further configured to:

generate image descriptions based on the image features and the scenarios for the images to obtain the respective description texts for the scenarios.

12. The terminal of claim 9, wherein to execute keyword-based rhyme matching based on the respective description texts, the processor is further configured to:

obtain, from the respective description texts, Chinese pinyins and rhymes, the Chinese pinyins and rhymes corresponding to last words in the respective description texts; and generate the respective rhyming lyrics corresponding to the images based on the Chinese pinyins and the rhymes, wherein the respective rhyming lyrics each have a same corresponding rhyme as the last word in the respective description text.

13. The terminal of claim 12, wherein to obtain the Chinese pinyins and rhymes and to generate the respective rhyming lyrics corresponding to the images based on the Chinese pinyins and rhymes, the processor is configured to:

arrange the Chinese pinyins corresponding to the last words in the description texts;

determine a distribution rule based on the arranged Chinese pinyins;

determine the rhyme based on the Chinese pinyins that satisfy the distribution rule; and obtain the respective rhyming lyrics corresponding to the images from pre-generated lyrics patterns based on the scenarios for the images and the rhymes.

14. The terminal of claim 13, wherein to obtain the respective rhyming lyrics corresponding to the images from pre-generated lyrics patterns based on the scenarios for the images and the rhymes, the processor is configured to:

generate image description lyrics based on the respective description text;

obtain supplementary lyrics from the pre-generated lyrics patterns based on the scenarios corresponding to the images and the rhymes; and synthesize the image description lyrics with the supplementary lyrics to obtain the rhyming lyrics.

15. The terminal of claim 9, wherein to convert the respective rhyming lyrics corresponding to the images into a speech, the processor is further configured to:

executing text analysis on the respective rhyming lyrics corresponding to the images to obtain a text analysis result;

extracting a linguistic feature from the text analysis result;

executing phoneme-level duration prediction and adaptive duration adjustment based on the linguistic feature to obtain a rhythm feature and a part-of-speech feature corresponding to the rhyming lyrics; and generating pronunciations based on a neural network model, the linguistic feature, the rhythm feature, and the part-of-speech feature to obtain the speech.

16. A non-transitory computer-readable storage medium, comprising:

a plurality of instructions executable by a processor, the instructions comprising:

instructions executable by the processor to identify, based scenario recognition, scenarios for images previously received;

instructions executable by the processor to generate respective description texts for the scenarios;

instructions executable by the processor to cause keyword-based rhyme matching based on the respective description texts;

instructions executable by the processor to generate respective rhyming lyrics corresponding to the images;

instructions executable by the processor to convert the respective rhyming lyrics corresponding to the images into a speech; and instructions executable by the processor to synthesize the speech with preset background music to obtain image music.

17. The non-transitory computer-readable storage medium of claim 16, wherein the instructions executable by the processor to identify, based scenario recognition, the scenarios for images previously received further comprise:

instructions executable by the processor to obtain image features for the images based on a deep learning neural network model; and instructions executable by the processor to determine the scenarios for the images based on the image features, wherein the instructions executable by the processor to generate respective description texts for the scenarios further comprise:

instructions executable by the processor to generate image descriptions based on the image features and the scenarios for the images to obtain the respective description texts for the scenarios.

18. The non-transitory computer-readable storage medium of claim 16, wherein the instructions executable by the processor to cause keyword-based rhyme matching based on the respective description texts further comprise:

instructions executable by the processor to obtain, from the respective description texts, Chinese pinyins and rhymes, the Chinese pinyins and rhymes corresponding to last words in the respective description texts; and instructions executable by the processor to generate the respective rhyming lyrics corresponding to the images based on the Chinese pinyins and the rhymes, wherein the respective rhyming lyrics each have a same corresponding rhyme as the last word in the respective description text.

19. The non-transitory computer-readable storage medium of claim 18, wherein the instructions executable by the processor to obtain the Chinese pinyins and rhymes and to generate the respective rhyming lyrics corresponding to the images based on the Chinese pinyins and rhymes comprise:

instructions executable by the processor to arrange the Chinese pinyins corresponding to the last words in the description texts;

instructions executable by the processor to determine a distribution rule based on the arranged Chinese pinyins;

instructions executable by the processor to determine the rhyme based on the Chinese pinyins that satisfy the distribution rule; and instructions executable by the processor to obtain the respective rhyming lyrics corresponding to the images from pre-generated lyrics patterns based on the scenarios for the images and the rhymes.

20. The non-transitory computer-readable storage medium of claim 19, wherein the instructions executable by the processor to obtain the respective rhyming lyrics corresponding to the images from pre-generated lyrics patterns based on the scenarios for the images and the rhymes comprise:
  instructions executable by the processor to generate image description lyrics based on the respective description text;
  instructions executable by the processor to obtain supplementary lyrics from the pre-generated lyrics patterns based on the scenarios corresponding to the images and the rhymes; and
  instructions executable by the processor to synthesize the image description lyrics with the supplementary lyrics to obtain the rhyming lyrics.

\* \* \* \* \*